US009516552B2

(12) United States Patent
Anderson et al.

(10) Patent No.: US 9,516,552 B2
(45) Date of Patent: Dec. 6, 2016

(54) ENSURING QUALITY OF BANDWIDTH IN A WI-FI CONNECTION TO AN INTERNET ACCESS POINT

(71) Applicant: INTERNATIONAL BUSINESS MACHINES CORPORATION, Armonk, NY (US)

(72) Inventors: Jason L. Anderson, San Jose, CA (US); Gregory J. Boss, Saginaw, MI (US); Andrew R. Jones, Round Rock, TX (US); Kevin C. McConnell, Austin, TX (US); John E. Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 14/607,257

(22) Filed: Jan. 28, 2015

(65) Prior Publication Data
US 2016/0219462 A1 Jul. 28, 2016

(51) Int. Cl.
*H04W 28/20* (2009.01)
*H04W 28/10* (2009.01)
*H04W 72/04* (2009.01)

(52) U.S. Cl.
CPC ............ *H04W 28/20* (2013.01); *H04W 28/10* (2013.01); *H04W 72/0453* (2013.01)

(58) Field of Classification Search
CPC ... H04W 28/10; H04W 28/20; H04W 72/0453
See application file for complete search history.

(56) References Cited

U.S. PATENT DOCUMENTS

| 8,077,665 B2 | 12/2011 | Murugesu et al. |
| 8,179,838 B2 | 5/2012 | Tang et al. |
| 2004/0117613 A1 | 6/2004 | Edmondson |
| 2005/0018697 A1 | 1/2005 | Enns et al. |

(Continued)

FOREIGN PATENT DOCUMENTS

WO 2008101255 A1 8/2008

OTHER PUBLICATIONS

D. Johnson et al., "The Dynamic Source Routing Protocol (DSR) for Mobile Ad Hoc Networks for IPv4 (RFC4728)", The IETF Trust, IPCOM000146278D, Feb. 1, 2007, pp. 1-109, IP.com.

(Continued)

*Primary Examiner* — Khaled Kassim
*Assistant Examiner* — Zhaohui Yang
(74) *Attorney, Agent, or Firm* — John R. Pivnichny; Law Office of Jim Boice

(57) ABSTRACT

A method ensures Quality of Bandwidth (QoB) in a Wi-Fi connection between one or more wireless devices and an access point to an Internet. A hardware access point controller receives a plurality of requests for data transmission bandwidth between multiple wireless devices and an access point. The access point provides access to the Internet, the requests are for overlapping time periods. The hardware access point controller dynamically allocates subsets of bandwidth capacity provided by the access point to each of the wireless devices. A position detector detects a movement of a specific wireless device relative to the access point. The hardware access point controller identifies a change in data transmission bandwidth between the specific wireless device and the access point caused by the movement of the specific wireless device, and adjusts the subsets of bandwidth capacity by adjusting available frequencies for the specific wireless device.

18 Claims, 3 Drawing Sheets

(56) References Cited

U.S. PATENT DOCUMENTS

| | | |
|---|---|---|
| 2007/0076603 A1 | 4/2007 | MeLampy et al. |
| 2008/0025230 A1 | 1/2008 | Patel et al. |
| 2009/0074002 A1 | 3/2009 | Kam et al. |
| 2009/0323608 A1* | 12/2009 | Adachi ............... H04W 48/18 370/329 |
| 2010/0260048 A1* | 10/2010 | Dolganow ............ H04L 43/028 370/235 |
| 2010/0296474 A1 | 11/2010 | Noriega |
| 2011/0096675 A1 | 4/2011 | Li et al. |
| 2013/0229995 A1 | 9/2013 | Cai et al. |

OTHER PUBLICATIONS

J. Chroboczek, "The Babel Routing Protocol (RFC6126)", IPCOM000205863D, Apr. 1, 2011, pp. 1-91, IP.com.

Anonymous, "Method and System for Providing Adequate Bandwidth for a User at a Specific Location", IP.com No. 000236851, May 19, 2014, pp. 1-3, IP.com.

J. Manner et al., "NSIS Signaling Layer Protoco (NSLP) for Quality-of-Service Signaling (RFC5974)", IPCOM000200343D, Oct. 1, 2010, pp. 1-205, IP.com.

J. Polk et al., "A Resource Reservation Protocol (RSVP) Extension for the Reduction of Bandwidth of a Reservation Flow (RFC4495)", IPCOM000136119D, May 1, 2006, pp. 1-23, IP.com.

J. Ash, "Max Allocation with Reservation Bandwidth Constraints Model for Diffserv-aware MPLS Traffic Engineering & Performance Comparisons (RFC4126)", IPCOM000126014D, Jun. 1, 2005, pp. 1-24, IP.com.

L. Frenzel, "White Space Gives New Life to Old", Electronic Design, electronicdesign.com, Jul. 2014, pp. 28-34, Penton.

* cited by examiner

ENSURING QUALITY OF BANDWIDTH IN A WI-FI CONNECTION TO AN INTERNET ACCESS POINT

BACKGROUND

The present disclosure relates to the field of electronic devices, and specifically to electronic wireless devices that utilize wireless connections to an access point for the Internet. Still more particularly, the present disclosure relates to ensuring that wireless devices receive a pre-negotiated level of Quality of Bandwidth (QoB) to the access point.

SUMMARY

In an embodiment of the present invention, a method ensures Quality of Bandwidth (QoB) in a Wi-Fi connection between one or more wireless devices and an access point to an Internet. A hardware access point controller receives a plurality of requests for data transmission bandwidth between multiple wireless devices and an access point. The access point provides access to the Internet, the requests are for overlapping time periods, and each of the requests to the access point is via a packet that has a token in a packet header of the packet. The hardware access point controller, in real time over said overlapping time periods, dynamically allocates subsets of bandwidth capacity provided by the access point to each of the wireless devices. A position detector detects a movement of a specific wireless device relative to the access point. The hardware access point controller identifies a change in data transmission bandwidth between the specific wireless device and the access point caused by the movement of the specific wireless device. In response to identifying the change in data transmission bandwidth between the specific wireless device and the access point caused by the movement of the specific wireless device, the hardware access point controller adjusts the subsets of bandwidth capacity by adjusting available frequencies for the specific wireless device.

In an embodiment of the present, a computer program product ensures Quality of Bandwidth (QoB) in a Wi-Fi connection between one or more wireless devices and an access point to an Internet. The computer program product comprises a computer readable storage medium having program code embodied therewith, wherein the computer readable storage medium is not a transitory signal per se, and the program code is readable and executable by a processor to perform a method comprising: receiving a plurality of requests for data transmission bandwidth between multiple wireless devices and an access point, wherein the access point provides access to the Internet, wherein the requests are for overlapping time periods, and wherein each of the requests to the access point is via a packet that has a token in a packet header of the packet; dynamically allocating, in real time over said overlapping time periods, subsets of bandwidth capacity provided by the access point to each of the multiple wireless devices; receiving a detection, from a position detector, of a movement of a specific wireless device relative to the access point, wherein the specific wireless device is from the multiple wireless devices; identifying a change in data transmission bandwidth between the specific wireless device and the access point caused by the movement of the specific wireless device; and in response to identifying the change in data transmission bandwidth between the specific wireless device and the access point caused by the movement of the specific wireless device, adjusting, by the hardware access point controller, said subsets of bandwidth capacity by adjusting available frequencies for the specific wireless device.

In an embodiment of the present invention, a system comprises a hardware access point controller, an access point communicatively coupled to the hardware access point controller, and a position detector. The hardware access point controller receives a plurality of requests for data transmission bandwidth between multiple wireless devices and the access point. The access point provides access to the Internet, the requests are for overlapping time periods, and each of the requests to the access point is via a packet that has a token in a packet header of the packet. The hardware access point controller dynamically allocates, in real time over said overlapping time periods, subsets of bandwidth capacity provided by the access point to each of the multiple wireless devices. The position detector detects a movement of a specific wireless device relative to the access point, where the specific wireless device is from the multiple wireless devices. The hardware access point controller identifies a change in data transmission bandwidth between the specific wireless device and the access point caused by the movement of the specific wireless device. The hardware access point controller, in response to identifying the change in data transmission bandwidth between the specific wireless device and the access point caused by the movement of the specific wireless device, adjusts the subsets of bandwidth capacity by adjusting available frequencies for the specific wireless device.

DETAILED DESCRIPTION

Figure 1:
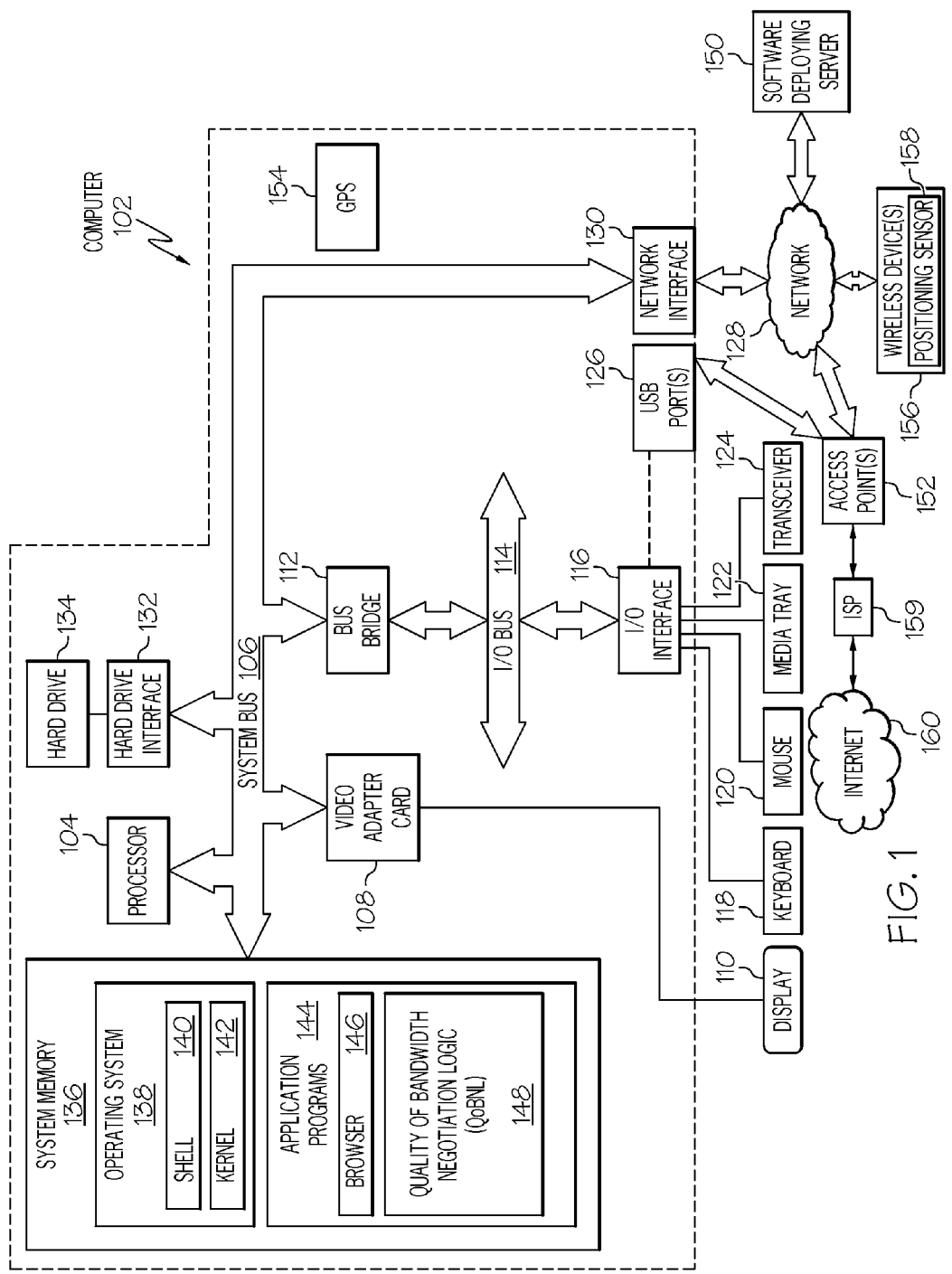
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150, access point(s) 152, and/or wireless device(s) 156.

Exemplary computer 102 includes a processor 104 that is coupled to a system bus 106. Processor 104 may utilize one or more processors, each of which has one or more processor cores. A video adapter card 108, which drives/supports a display 110, is also coupled to system bus 106. In one or more embodiments of the present invention, video adapter card 108 is a hardware video card. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN) such as a Wi-Fi network.

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Quality of Bandwidth (QoB) Negotiation Logic (QoBNL) 148. QoBNL 148 includes code for implementing the processes described below, including those described in FIGS. 2-3. In one embodiment, computer 102 is able to download QoBNL 148 from software deploying server 150, including in an on-demand basis, wherein the code in QoBNL 148 is not downloaded until needed for execution. Note further that, in one embodiment of the present invention, software deploying server 150 performs all of the functions associated with the present invention (including execution of QoBNL 148), thus freeing computer 102 from having to use its own internal computing resources to execute QoBNL 148.

In one or more embodiments of the present invention, computer 102 includes a geographic locator, such as a global positioning system (GPS) device 154 that utilizes signals from GPS satellites to determine the current geophysical/geographic position of the computer 102.

Computer 102 (which in one or more embodiments operates as an access point controller for controlling access point(s) 152 to the Internet 160. In one or more embodiments of the present invention, wireless device(s) 156 connect to the Internet 160 via a Wi-Fi network such as network 128 and access point(s) 152, which afford access to an Internet Service Provider (ISP) 159. That is, the wireless device(s) 156 first connect to the Wi-Fi network (network 128), which connects them to access points(s) 152, which are routers/connections to the Internet 160. These connections and the assurance of Quality of Bandwidth (QoB) provided by the Wi-Fi network (network 128) is managed by computer 102 operating as an access point controller, thereby directing the access point(s) 152 on adjusting bandwidth in order to meet QoB commitments/contracts.

Examples of wireless device(s) 156 include, but are not limited to, laptop computers, smart phones, tablet computers, etc., as well as less mobile but still wireless devices such as desktop computers that connect to the Internet 160 via a Wi-Fi or other wireless connection.

Within one or more of the wireless device(s) 156 is at least one positioning sensor 158, which identifies a physical position (i.e., location) of the wireless device. In one embodiment, positioning sensor 158 is a GPS system, which uses signal from GPS satellites to determine the physical location of the wireless device. In one embodiment, positioning sensor 158 read signals from one or more local transmitters (not shown) within a limited area, such as a room. These signals are then interpreted, based on how long they take to arrive from the local transmitters using time stamps in the signals, to determine the physical location of the wireless device within the room. Other embodiments use any other type of positioning system, including grid sensors (e.g., radio frequency identifier (RFID) interrogators, which are laid out in a grid within the floor of the room, which detect the presence of a wireless device by reading a limited-range RFID chip in the wireless device), video analysis (e.g., logic that locks onto a particular video image of a wireless device and tracks its movement), etc.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

The present invention presents various methods by which Wi-Fi connections pre-negotiate a guaranteed amount of Quality of Bandwidth (QoB). At the time of the connection to the Wi-Fi network, a negotiation is made between a wireless access point (that connects to the Internet) and a wireless client (e.g., a smart phone, a tablet computer, etc.) to enable a QoB bandwidth reservation for the connecting wireless client to ensure that the Wi-Fi performance, due to over subscription of that access point and the associated Internet pipe (connection to the Internet via the Internet service provider, wired/wireless pathways, etc.), does not drop below a stated negotiated bandwidth threshold. If the bandwidth is available, the connection does not necessarily need to be throttled. However, if sufficient bandwidth is not available, particularly because of the distance between the wireless device and the access point, the present invention determines what QoB can be maintained over that distance, and/or makes appropriate adjustments. As described herein, the QoB may drop if the wireless device's movement increases the distance to the access point (AP) and/or causes new/additional obstacles (e.g., a wall or furniture in a room) to be positioned between the wireless device and the AP, thus degrading the Wi-Fi connection there between. In one embodiment, the present invention warns the user beforehand that such actions (movement of the wireless device) could invalidate an existing guarantee for a certain level of QoB.

For example, assume that a user is sitting in a coffee shop and would like to perform a bandwidth sensitive operation (e.g., a voice over internet protocol—VOIP call, a remote desktop connection, etc.). When the user connects to the provided Wi-Fi network, he/she is provided with the option of selecting a certain amount of guaranteed bandwidth (Quality of Bandwidth—QoB) for the duration of the connection (at a fee), or the user may choose to use a free Wi-Fi connection without any guarantees of bandwidth. For example, the user may selection Option 1, in which no guarantees or bandwidth are provided; Option 2, in which a first level of bandwidth (e.g., 20 Mbytes/minute) is guaranteed for a first fee (e.g., $1.99/hour); or Option 3, in which a second level of bandwidth (e.g., 40 Mbytes/minute) is guaranteed for a second fee (e.g., $3.99/hour). The present invention provides various novel embodiments of ensuring that the negotiated QoB (e.g., Option 2 and/or Option 3) will be provided.

Figure 2:
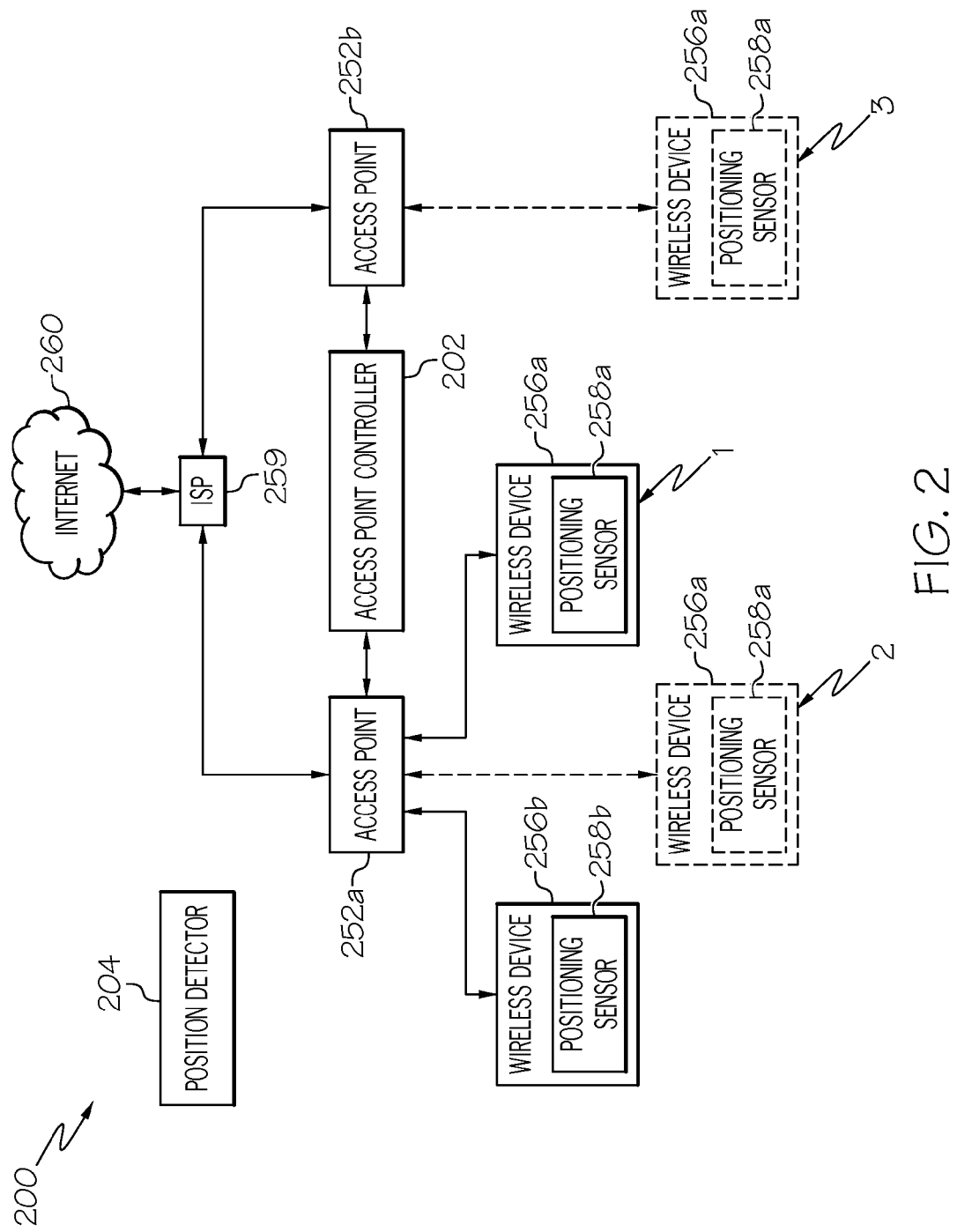
FIG. 2 illustrates an exemplary system in which Quality of Bandwidth (QoB) is dynamically adjusted for one or more wireless devices in a Wi-Fi network.

With reference now to FIG. 2, an exemplary system 200 in which Quality of Bandwidth (QoB) is dynamically adjusted for one or more wireless devices in a Wi-Fi network is presented.

For purposes of illustration, assume that a user of a wireless device 256a (analogous to one of the wireless device(s) 156 shown in FIG. 1) is at a location that offers Wi-Fi service. This Wi-Fi service is provided by one or more access points 252a-252b (analogous to access point(s) 152 in FIG. 1), which connect to an Internet Service Provider (ISP) 259 (analogous to ISP 159 in FIG. 1), which provides access to the Internet 260.

The position of a particular wireless device from wireless devices 256a-256b is detected by one of the positioning sensors 258a-258b within the wireless devices 256a-256b, and/or by a position detector 204 that is nearby.

For example, positioning sensor 258a (analogous to positioning sensor 158 in FIG. 1) may detect a change in GPS coordinates, grid coordinates, etc. experienced by wireless device 256a. By comparing the GPS/grid coordinates detected by a positioning sensor (not shown) in access point 252a with those from positioning sensor 258a, a distance between wireless device 256a and access point 252a can be determined in real time.

Similarly, position detector 204 can detect movement (both direction and distance) by the wireless device 256a. Position detector 204 can use various types of energy (e.g., infrared, microwave, ultrasonic, etc.) to detect a phase shift of reflected energy caused by repositioning of the wireless device 256a. That is, as wireless device 256a moves, energy directed towards it will bounce back to the position detector 204 at different Doppler shifts (i.e., the phase difference between when the energy was sent out and when it was received back, assuming that the period of the energy remains constant), thus indicating the position of the wireless device 256a relative to the position detector 204.

In one embodiment of the present invention, the distance between the position detector 204 and the wireless device 256a, or the distance between the access point 252a and the wireless device 256a, is based on the strength of the Wi-Fi signal received by the wireless device 256a from the access point 252a. That is, assume that wireless device 256a receives a Wi-Fi signal that has a strength of 90 µW when 5 feet from the access point 252a, a Wi-Fi signal that has a strength of 40 µW when 10 feet from the access point 252a, and a Wi-Fi signal that has a strength of 10 µW when 15 feet from the access point 252a. By sending a message to position detector 204, access point controller 202, and/or access point 252a from the wireless device 256a describing the power level of the Wi-Fi signal being received (e.g., 40 µW), then the distance between the access point 252a and the wireless device 256a (e.g., 10 feet) is indicated by this power level.

Despite its name, positioning sensor 158 in FIG. 1 (and/or positioning sensors 258a-258b in FIG. 2) is able to sense more than coordinate positions in one or more embodiments of the present invention. For example, in one embodiment positioning sensor 258a is able to detect physical obstacles between wireless device 256a and access point 252a, such as a wall, furniture, a load bearing beam, etc. This obstacle detection may be achieved using echo-location, in which a signal (e.g., sound or electromagnetic signals) is bounced off the obstacle. The positioning sensor 258a measures how long it takes the signal to return to the positioning sensor 258a, thereby identifying the location of the obstacle.

Assume now that wireless device 256a has pre-negotiated with access point controller 202 and/or access point 252a to receive a certain QoB (e.g., 20 Mbps of data bandwidth for the next 10 minutes). Assume further that while at position 1, wireless device 256a is close enough to access point 252a such that access point 252a is able to provide the pre-negotiated QoB. However, when moved to position 2 (as detected by positioning sensor 258a and/or position detector 204), access point 252a is no longer able to deliver this pre-negotiated QoB due to the increased distance between wireless device 256a and access point 252a. This bandwidth decrease is due to power drop-off over distance, which reduces how much data carrier signals from the access point 252a are able to transmit. That is, as wireless device 256a moves farther away from access point 252a, the strength (wattage) of the Wi-Fi signal from a transceiver (not shown in FIG. 2 but analogous to transceiver 124 in FIG. 1) in the access point 252a decreases. This decrease in signal strength reduces overall bandwidth (i.e., ability to transmit digital data) since lower power results in a lower signal-to-noise ratio. That is, as power decreases, the signal-to-noise ratio decreases, and lower frequency modulation is available, thereby decreasing the bandwidth.

In one embodiment, the decrease in strength (wattage) of the Wi-Fi signal caused by the wireless device 256a moving from position 1 to position 2 is overcome by the access point controller 202 directing the access point 252a to boost the signal coming out of the access point 252a. This signal boosting is achieved in various ways according to various embodiments of the present invention.

In one embodiment, the signal is boosted by beamforming, in which two signals of a same frequency from the access point 252a are combined (i.e., using "constructive interference") to increase the power of the Wi-Fi signal. That is, two transmitters (not shown) within access point 252a simultaneously transmit a same carrier wave in phase, thus creating an enhanced single carrier wave.

In another embodiment of the present invention, the signal is boosted by merely increasing the power going to the access point 252a, thus resulting in a stronger output signal.

In another embodiment of the present invention, the signal is boosted by switching to a different frequency that is currently unused/underutilized in the access point 252a and/or access point 252b. While the signal power is not increased, the capacity of the signal is increased (thus "boosting" the signal) since the new (fresh) frequency is not burdened with data from other sessions/contracts.

In another embodiment, the signal is boosted by spreading out the bandwidth over multiple frequencies (e.g., using a Direct Sequence Spread Spectrum—DSSS), in which packets of data are subdivided into sub-packets, which are transmitted on different frequencies from the access point 252a.

Continuing with the example shown in FIG. 2, assume that wireless device 256a has moved to position 3, which is even farther from access point 252a than when at position 2, but is now closer to access point 252b. As this position 3, the access point controller 202 directs access point 252b to take over the Wi-Fi connection to wireless device 256a, assuming that access point 252b has sufficient available bandwidth to service wireless device 256a. Since access point 252b is close to wireless device 256a, then an assumption is made that the strength of the Wi-Fi signal reaching the wireless device 256*a* is strong enough to fulfil the QoB contract that the wireless device 256*a* negotiated earlier with the access point controller 202.

Assume further in FIG. 2 that wireless device 256*b* has not pre-negotiated a contract for a certain level of QoB with access point controller 202. With respect then to wireless device 256*b*, it will be allowed to use any "leftover" Wi-Fi bandwidth that is available after the QoB contract for wireless device 256*a* has been met.

Figure 3:
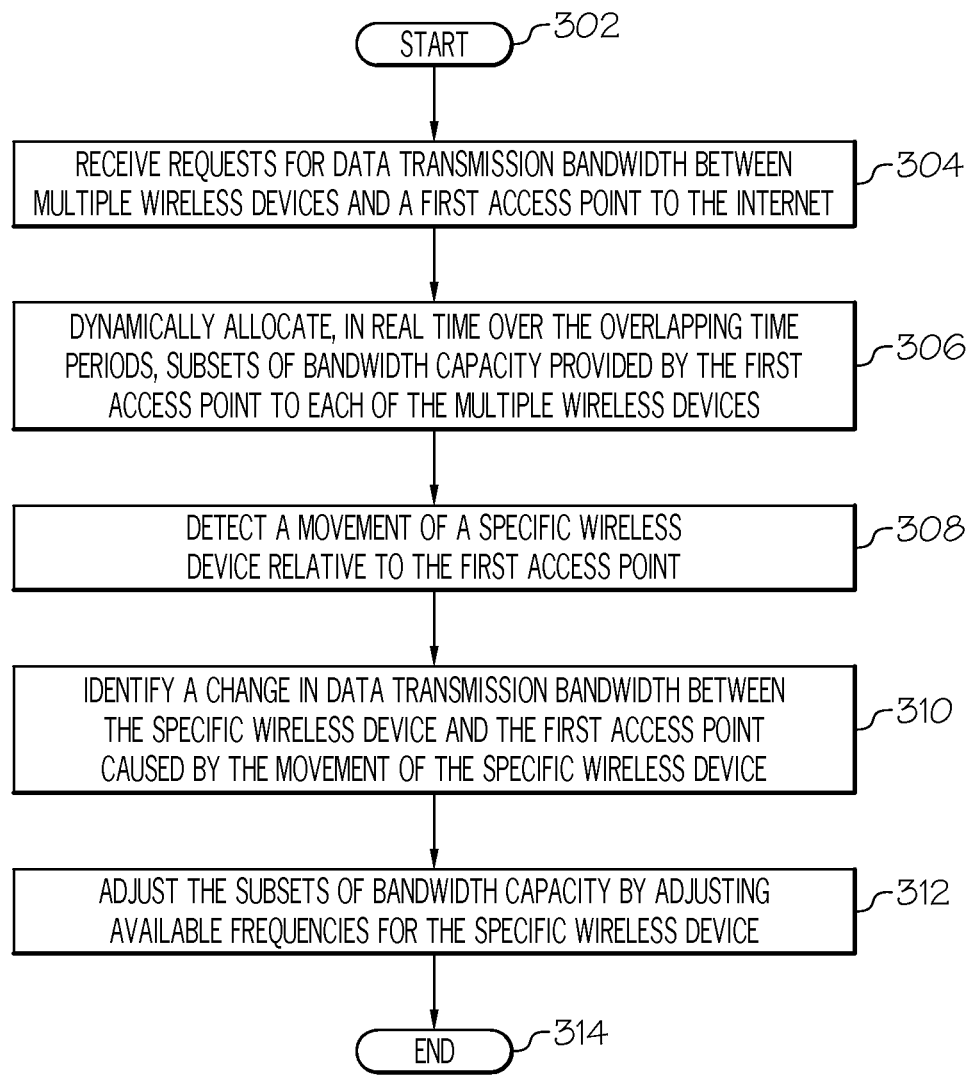
FIG. 3 is a high level flow-chart of one or more operations performed by one or more hardware devices to ensure QoB in a Wi-Fi connection between one or more wireless devices and an access point to an Internet.

FIG. 3 is a high level flow-chart of one or more operations performed by one or more hardware devices to ensure QoB in a Wi-Fi connection between one or more wireless devices and an access point to an Internet.

After initiator block 302, a hardware access point controller (e.g., access point controller 202 in FIG. 2) receives a plurality of requests for data transmission bandwidth between multiple wireless devices (e.g., wireless devices such as wireless device 256*a* shown in FIG. 2) and a first access point (e.g., access point 252*a* in FIG. 2), such that the first access point provides access to the Internet.

In one embodiment of the present invention, the requests are for overlapping time periods. For example, a first wireless device may want to have guaranteed bandwidth (QoB) from times T1-T3, while a second wireless device may want a certain QoB between times T2-T4. Assuming that times T1-T4 are sequential, then there is an overlap between times T2-T3, during which both the first and second wireless devices want certain QoBs.

In one embodiment of the present invention, each of the requests to the first access point is via a packet that has a token in a packet header of the packet. That is, the request for a certain level of QoB is sent in a packet from the wireless device to the access point. This packet includes a packet header, which holds a token. This token may describe the level of QoB being negotiated (e.g., 20 Mbps—million bits per second), the length of time that the QoB is for (e.g., 10 minutes), the total amount of data to be transferred (e.g., 80 MB—million bytes), the priority of the requester (e.g., placing the requesting device "first in line" for having bandwidth reserved for its user), etc.

Returning now to block 306 of FIG. 3, the hardware access point controller dynamically allocates, in real time over the overlapping time periods, subsets of bandwidth capacity provided by the first access point to each of the multiple wireless devices. That is, a particular access point, or even a particular channel within the particular access point, may have multiple subsets of frequencies on which data can be carried. The access point controller and/or the access point allocate these subsets of frequencies to particular wireless devices.

As described in block 308 of FIG. 3, a position detector (e.g., the positioning sensor 258*a* and/or the position detector 204 described above in FIG. 2) detects a movement of a specific wireless device (i.e., one of the multiple wireless devices) relative to the first access point.

As described in block 310 of FIG. 3, the hardware access point controller identifies a change in data transmission bandwidth between the specific wireless device and the first access point caused by the movement of the specific wireless device. That is, the hardware access point controller (e.g., access point controller 202) detects that the QoB between the first access point and the specific wireless device has dropped due to 1) an increase in distance between the first access point and the specific wireless device, and/or 2) an increase in signal blockage due to a physical obstruction that is now between the first access point and the specific wireless device due to the movement of the specific wireless device.

As described in block 312 in FIG. 3, in response to identifying the change in data transmission bandwidth between the specific wireless device and the first access point caused by the movement of the specific wireless device, the hardware access point controller adjusts the subsets of bandwidth capacity by adjusting available frequencies for the specific wireless device.

In one embodiment of the present invention, the hardware access point controller adjusts available frequencies to the specific wireless device by beamforming multiple frequencies to create an amplified frequency used in data transmission between the first access point and the specific wireless device. In one embodiment, such beamforming combines phase-shifted frequencies from the first access point, in order to ensure the constructive (additive) interference occurs.

In one embodiment of the present invention, the hardware access point controller adjusts available frequencies to the specific wireless device by switching to a different frequency (e.g., a lesser-used frequency) that is available from the first access point.

In one embodiment of the present invention, the hardware access point controller adjusts available frequencies to the specific wireless device by appropriating a second frequency from a second access point, such that the second frequency from the second access point augments a first frequency used between the first access point and the specific wireless device. For example, assume in FIG. 2 that wireless device 256*a* initially was receiving the negotiated QoB at position 1, but that the QoB dropped below the negotiated level when wireless device 256*a* moved to position 2. In this embodiment, additional bandwidth is pulled from access point 252*b*, thereby augmenting the bandwidth received from access point 252*a*, such that the negotiated QoB can now be delivered to wireless device 256*a*.

The flow-chart shown in FIG. 3 ends at terminator block 314.

In one embodiment of the present invention, the data transmission bandwidth between the specific wireless device and the first access point is reserved for a recurring time of day that is identified by the token in the packet header. For example, assume that a user wants to be certain that he/she will have 20 Mbps of bandwidth available every day at a particular location (e.g., a coffee shop) between 1:00 PM and 2:00 PM Monday through Friday. The token will identify this QoB "reservation", and will reserve adequate bandwidth for those times in order to meet the pre-negotiated QoB for that user.

In one embodiment of the present invention, the hardware access point controller identifies remaining data transmission bandwidth that is unreserved after fulfilling data transmission bandwidth requirements between the specific wireless device and the access point, and then releases the remaining data transmission bandwidth to other wireless devices from the multiple wireless devices. That is, once all negotiated QoB bandwidth has been allocated, whatever bandwidth remains is available to other devices that are not under contract with the system.

As described herein, the present invention provides a system for ensuring QoB to certain users. In one or more embodiments of the present invention, the following three steps are first performed by the access point controller and/or the access point(s).

1) The access point controller determines a physical location of the access point and the connecting wireless device. This physical location determination can be performed using the positioning sensors 258a-258b and/or the position detector 204 shown in FIG. 2.

2) The access point controller determines the signal strength between the access point and the connecting wireless device. The signal strength is thus used to determine what the current (QoB) bandwidth availability is from that access point.

3) The location of the wireless device is monitored. If the access point controller receives a signal from the positioning sensor 258a and/or position detector 204 indicating movement of the wireless device 256a, the access point controller may send an alert to the wireless device 256a that the QoB that was pre-negotiated by the wireless device 256a at the time of connection might not be maintained at this new position.

Three exemplary methods for negotiating a QoB contract between a wireless device and an access point are as follows:
Method 1: Pre-Negotiate at Connection Time for Length of Connection Method 1 modifies an existing Wi-Fi connection header to include an additional field for bandwidth guarantee (QoB). If the access point can guarantee this amount of bandwidth, it then completes the Wi-Fi connection and maintains that amount of bandwidth in reserve for the length of the connection. The access point can continue to accept additional connections so long as:

guaranteed bandwidth to wifi connections≤total bandwidth capacity

Method 2: Pre-Negotiate at Connection Time for Fixed Length of Time (with Reservations)

Method 2 modifies Method 1 in that when the Wi-Fi connection is created, the QoB is only guaranteed for a fixed amount of time (e.g., 30 minutes). After this fixed amount of time expires, the Wi-Fi connection no longer can guarantee that the QoB will be met, and the promised QoB is re-negotiated, terminated, and/or returned to a pre-defined default. Method 2 further enables the time/date reservations described above.

Method 3: Pre-Negotiate at Connection Time for QoB Tokens

Method 3 leverages a "QoB token" concept described above, in which the token is an authorization to use X amount of bandwidth, receive/send Y amount of data, for Z amount of time, etc. (as described above). In one embodiment of the present invention, such tokens have a limited lifetime. Once the token has expired, the bandwidth is no longer guaranteed.

The invention described herein can be further extended as a rolling window. Instead of a hard guaranteed QoB at the time the Wi-Fi connection is made, a user is given a "rolling window QoB", which is a guarantee only for the next X minutes. Then as more users connect and some of those are VIP users (e.g., Platinum users of a particular Internet service, hotel, airline, etc.), the VIP users will get more bandwidth than the regular members. Therefore, as long as the Wi-Fi connection has enough bandwidth capacity, the initial contract will continue to roll past the X minutes. However, if the Wi-Fi connection has a drop in bandwidth capacity after these X minutes, then the user is no longer guaranteed a QoB at the initially-negotiated level.

In one embodiment of the present invention, the methods described herein are propagated up a chain of network devices and/or service providers to make a complete end-to-end QoB guarantee. For example, a local access point in a coffee shop can pass the same field in the session negotiation packet between the user and the access point on to the Internet Service Provider (ISP). Passing this field to the ISP results in a request for the same bandwidth guarantee (the QoB that was negotiated with the access point) from the ISP. Assuming that the ISP accepts the token/field requesting the guaranteed QoB, the ISP will provide the requisite bandwidth to fulfil the QoB contract.

In one embodiment of the present invention, the access point controller and/or access point begins by determining the total amount of bandwidth that is available. The access point controller and/or access point then presents one or more contract options to a first customer to join. If that customer accepts a QoB contract for time period N, then the access point controller and/or access point will remove this capacity from future calculations. When the next customer accepts a QoB contract for time period O, the access point controller (acting as a router) will then perform a best fit algorithm to the combination of the two contracts over time periods N and O. As more and more QoB contracts are accepted, the router will rearrange the time windows during which the QoB contracts are in effect either by moving them, or by decreasing the time window while simultaneously increasing the bandwidth allotment for each contract. For example, if a user wants to have a QoB of 20 Mbps for 20 minutes, but a heavy user wants to start using 80 Mbps of bandwidth 10 minutes from now, then the system may offer the first user 40 Mbps for 10 minutes, thus giving him the same total bandwidth in the shorter time frame, thus allowing QoB contract holder X to receive more data over a shorter period of time. Conversely, the system may elongate the time window (up to the max threshold) and reduce the allowed bandwidth in order to make room for another incoming QoB contract. Since contracts can be both arbitrary (set bandwidth for set time) and dynamic (set amount of data over a maximum time period), the presently described methodology is novel and provides a useful improvement over existing bandwidth shaping techniques used in the prior art.

In an exemplary scenario in which the present invention is used, assume that a user enters a coffee shop, opens his/her smart phone, and sees a list of three Wi-Fi network options. Option A offers free Wi-Fi, but with no throughput guarantees. Option B is a premium option that charges $0.10/MB with a limit of 50 MB. Option C is another premium option that charges $0.20/MB with a limit of 200 MB. The user has a large architecture drawing he/she wants to read over lunch, and so he/she chooses the $0.20/MB option and requests a 80 MB QoB for a time period of 15 minutes. The network responds that it can give him/her a guarantee to receive 80 MB of variable bandwidth over the next 15 minutes. The contract is completed and variable bandwidth is assigned to the user. Over the first 3 minutes the user only gets 3.3 MB delivered per minute (for a total of 10 MB of data). However, after these first 3 minutes, the router (i.e., access points(s) such as access points 252a-252b in FIG. 2) has completed two other contracts, and now has enough extra capacity to increases bandwidth to 10 MB per minute to be delivered for the next 7 minutes (for an additional 70 MB of data). The user thus gets a total of 80 Mb of data in 10 minutes (5 minutes under the contract), at which point the router moves into a best effort (no bandwidth guarantees) basis.

As described above and in one embodiment of the present invention, the system can employ additional measures to help maintain QoB to account for roaming users that get too far away from the Wi-Fi access point, thus causing a degradation of throughput. In this situation additional logic can be employed in the router (i.e., the access point) to implement beamforming, frequency hopping and/or channel skipping. For example, assume that a user has contracted to receive X amount of bandwidth and the system needs to fulfill the contract by provisioning 25 Mbps for the next 3 minutes. However, the user begins to move to a distant part of the room (away from the access point) and his signal strength is decreasing, thus causing the Wi-Fi client bandwidth to drop from the negotiated 25 Mbps down to 12 Mbps. Since this is below the contracted rate that the router is able to supply (internet speed), the router first searches for a frequency/channel that is more open. If it finds one, it switches to a non-overlapping uncontested frequency/channel. If that does not find a non-overlapping uncontested frequency/channel that can provide the full 25 Mbps link speed, then the router employs beamforming or other technology to create an overlapping signal that boosts reception and link speeds for the client. These types of strategies are employed until the link speed is greater than the internet speed for a given duration.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method of ensuring Quality of Bandwidth (QoB) in a Wi-Fi connection between one or more wireless devices and an access point to an Internet, the method comprising:
   receiving, by a hardware access point controller, a plurality of requests for data transmission bandwidth between multiple wireless devices and a first access point, wherein the first access point provides access to the Internet, wherein the requests are for overlapping time periods, and wherein each of the requests to the first access point is via a packet that has a token in a packet header of the packet;
   dynamically allocating, by the hardware access point controller and in real time over said overlapping time periods, subsets of bandwidth capacity provided by the first access point to each of the multiple wireless devices;
   detecting, by a position detector, a movement of a specific wireless device relative to the first access point, wherein the specific wireless device is from the multiple wireless devices;
   identifying, by the hardware access point controller, a change in data transmission bandwidth between the specific wireless device and the first access point caused by the movement of the specific wireless device;
   in response to identifying the change in data transmission bandwidth between the specific wireless device and the first access point caused by the movement of the specific wireless device, adjusting, by the hardware access point controller, said subsets of bandwidth capacity by adjusting available frequencies for the specific wireless device: and
   adjusting, by the hardware access point controller, available frequencies to the specific wireless device by beamforming multiple frequencies to create an amplified frequency used in data transmission between the first access point and the specific wireless device, wherein said beamforming combines phase-shifted frequencies from the first access point.

2. The method of claim 1, further comprising:
   adjusting available frequencies to the specific wireless device by switching to a different frequency in the first access point.

3. The method of claim 1, further comprising:
   adjusting, by the hardware access point controller, available frequencies to the specific wireless device by appropriating a second frequency from a second access point, wherein the second frequency from the second access point augments a first frequency used between the first access point and the specific wireless device.

4. The method of claim 1, wherein the token identifies a length of time being negotiated for the data transmission bandwidth.

5. The method of claim 1, wherein the token identifies a total amount of data negotiated for data transmission with the access point.

6. The method of claim 1, wherein the token identifies a priority of a requesting wireless device over other wireless devices from the multiple wireless devices.

7. The method of claim 1, wherein the token identifies a size of data transmission bandwidth being requested.

8. The method of claim 1, further comprising:
reserving the data transmission bandwidth between the specific wireless device and the first access point for a recurring time of day that is identified by the token in the packet header.

9. The method of claim 1, further comprising:
identifying, by the hardware access point controller, remaining data transmission bandwidth that is unreserved after fulfilling data transmission bandwidth requirements between the specific wireless device and the access point; and
releasing, by the hardware access point controller, the remaining data transmission bandwidth to other wireless devices from the multiple wireless devices.

10. A computer program product for ensuring Quality of Bandwidth (QoB) in a Wi-Fi connection between one or more wireless devices and an access point to an Internet, the computer program product comprising a computer readable storage medium having program code embodied therewith, wherein the computer readable storage medium is not a transitory signal per se, and wherein the program code is readable and executable by a processor to perform a method comprising:
receiving a plurality of requests for data transmission bandwidth between multiple wireless devices and a first access point, wherein the first access point provides access to the Internet, wherein the requests are for overlapping time periods, and wherein each of the requests to the first access point is via a packet that has a token in a packet header of the packet;
dynamically allocating, in real time over said overlapping time periods, subsets of bandwidth capacity provided by the first access point to each of the multiple wireless devices;
receiving a detection, from a position detector, of a movement of a specific wireless device relative to the first access point, wherein the specific wireless device is from the multiple wireless devices;
identifying a change in data transmission bandwidth between the specific wireless device and the first access point caused by the movement of the specific wireless device;
in response to identifying the change in data transmission bandwidth between the specific wireless device and the first access point caused by the movement of the specific wireless device, adjusting, by the hardware access point controller, said subsets of bandwidth capacity by adjusting available frequencies for the specific wireless device; and
adjusting available frequencies to the specific wireless device by beamforming multiple frequencies to create an amplified frequency used in data transmission between the first access point and the specific wireless device, wherein said beamforming combines phase-shifted frequencies from the first access point.

11. The computer program product of claim 10, wherein the method further comprises:
adjusting available frequencies to the specific wireless device by switching to a different frequency in the first access point.

12. The computer program product of claim 10, wherein the method further comprises:
adjusting available frequencies to the specific wireless device by appropriating a second frequency from a second access point, wherein the second frequency from the second access point augments a first frequency used between the first access point and the specific wireless device.

13. The computer program product of claim 10, wherein the token identifies a length of time being negotiated for the data transmission bandwidth.

14. The computer program product of claim 10, wherein the token identifies a total amount of data negotiated for data transmission with the access point.

15. The computer program product of claim 10, wherein the token identifies a priority of a requesting wireless device over other wireless devices from the multiple wireless devices.

16. The computer program product of claim 10, wherein the token identifies a size of data transmission bandwidth being requested.

17. The computer program product of claim 10, wherein the method further comprises:
reserving the data transmission bandwidth between the specific wireless device and the first access point for a recurring time of day that is identified by the token in the packet header.

18. A system comprising:
a hardware access point controller;
an access point communicatively coupled to the hardware access point controller; and
a position detector;
wherein the hardware access point controller receives a plurality of requests for data transmission bandwidth between multiple wireless devices and the access point, wherein the access point provides access to an Internet, wherein the requests are for overlapping time periods, and wherein each of the requests to the access point is via a packet that has a token in a packet header of the packet;
wherein the hardware access point controller dynamically allocates, in real time over said overlapping time periods, subsets of bandwidth capacity provided by the access point to each of the multiple wireless devices;
wherein the position detector detects a movement of a specific wireless device relative to the access point, wherein the specific wireless device is from the multiple wireless devices;
wherein the hardware access point controller identifies a change in data transmission bandwidth between the specific wireless device and the access point caused by the movement of the specific wireless device;
wherein the hardware access point controller, in response to identifying the change in data transmission bandwidth between the specific wireless device and the access point caused by the movement of the specific wireless device, adjusts said subsets of bandwidth capacity by adjusting available frequencies for the specific wireless device; and wherein the hardware access point controller adjusts available frequencies to the specific wireless device by beamforming multiple frequencies to create an amplified frequency used in data transmission between the first access point and the specific wireless device, wherein said beamforming combines phase-shifted frequencies from the first access point.

* * * * *